(12) United States Patent
Sugiura (10) Patent No.: US 7,077,556 B2
(45) Date of Patent: Jul. 18, 2006

(54) LIGHTING DEVICE AND LIQUID CRYSTAL DISPLAY DEVICE

(75) Inventor: Takuro Sugiura, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 68 days.

(21) Appl. No.: 10/679,671

(22) Filed: Oct. 6, 2003

(65) Prior Publication Data

US 2004/0085748 A1    May 6, 2004

(30) Foreign Application Priority Data

Oct. 16, 2002    (JP) .............................. 2002-301740

(51) Int. Cl.
*F21V 8/00*    (2006.01)

(52) U.S. Cl. ...................... 362/623; 362/615; 362/624

(58) Field of Classification Search ................... 362/31, 362/555, 561, 244, 146, 65, 610, 611, 615, 362/623, 624, 625, 608, 609
See application file for complete search history.

(56) References Cited

U.S. PATENT DOCUMENTS 6,286,970 B1    9/2001    Egawa et al.
6,652,109 B1 *  11/2003   Nakamura ................. 362/31
6,692,134 B1 *  2/2004    Ohwada et al. ............ 362/31

* cited by examiner

*Primary Examiner*—Sandra O'Shea
*Assistant Examiner*—Guiyoung Lee
(74) *Attorney, Agent, or Firm*—Brinks Hofer Gilson & Lione (57) ABSTRACT

A front light of the invention has a light guide plate, an intermediate light guide disposed along the side end surface, and a light emitting device disposed on an end surface thereof. The pitch between grooves having a wedge shape in cross section formed on a backside of the light guide on the opposite side of the light guide plate is formed so as to be linearly varied with respect to the distance from an end surface disposed with the light emitting device to the groove. The depth of the groove is formed more deeply as the grooves are positioned more apart from the end surface. In the distribution of the depth of the groove with respect to the distance from the end surface to the groove, there are a first area where the depth of the groove is linearly increased with respect to the distance from the end surface disposed with the light emitting device to the groove, and a second area formed apart from the light emitting device more than the first area in which the increasing rate of the depth of the groove with respect to the distance from the end surface is greater than that in the first area.

23 Claims, 8 Drawing Sheets

LIGHTING DEVICE AND LIQUID CRYSTAL DISPLAY DEVICE

This application claims the benefit of priority to Japanese Patent Application 2002-301740, filed on Oct. 16, 2002.

BACKGROUND OF THE INVENTION

1. Field of the Invention

The present invention relates to a light guide, a lighting device and a liquid crystal display device.

2. Description of the Related Art

For a front light of a reflective liquid crystal display device, a unit is used which is configured of a light source, an intermediate light guide, a light guide plate and a case for integrally holding them in which the inner side is formed to be reflective.

Figure 13A:
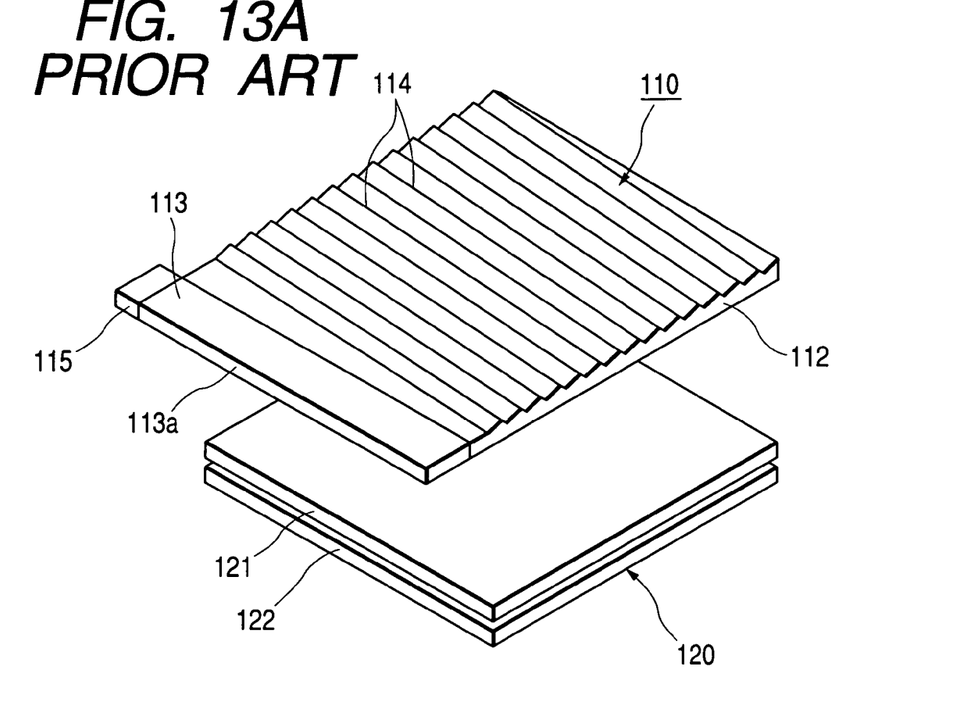
FIG. 13A is a perspective view illustrating a liquid crystal display device having a front light.
Figure 13B:
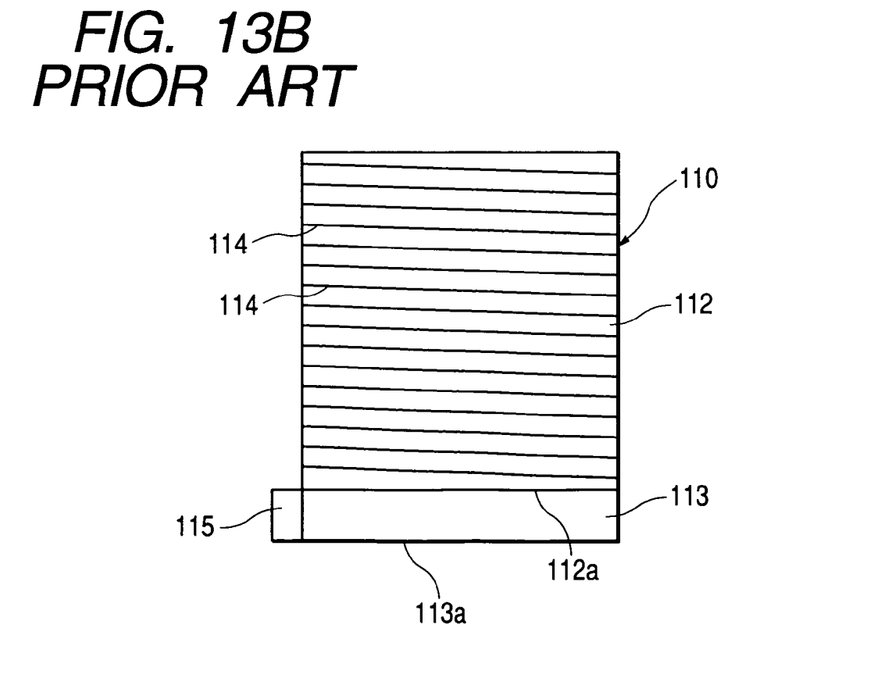
FIG. 13B is a cross section illustrating the liquid crystal display device shown in FIG. 13A.

FIG. 13A is a perspective view illustrating a liquid crystal display device having this configuration, and FIG. 13B is a plan view illustrating the liquid crystal display device shown in FIG. 13A. The liquid crystal display device shown in these drawings is configured of a liquid crystal display unit 120 and a front light 110 disposed on the front side of the liquid crystal panel 120. The detail is not shown in the drawings, however, the liquid crystal display device 120 is a reflective liquid crystal display unit that reflects light incident from the front side thereof for display in which a liquid crystal layer is sandwiched between an upper substrate 121 and a lower substrate 122 disposed as facing each other. The alignment state of the liquid crystal layer is controlled to vary the condition of light transmission for display.

The front light 110 is configured to have a flat light guide plate 112, a bar-shaped intermediate light guide 113 disposed on a side end surface 112a of the light guide plate 112, and a light emitting device 115 disposed on one end surface part of the intermediate light guide 113 in which a prism form formed of a plurality of protrusions 114 having a wedge shape seen in cross section is formed on the top side of the light guide plate 112. Then, the front light 110 irradiates the light emitted from the light emitting device 115 to the side end surface 112a of the light guide plate 112 through the intermediate light guide 113 and introduces it into the light guide plate 112. By reflecting the light on the inner side of the top of the light guide plate 112 where the prism form is formed, the direction of light transmission is changed, and the light is irradiated toward the liquid crystal display unit 120 from the under side of the light guide plate 112 in the drawing. As this type of front light, that described in Patent Document 1 below is known.

[Patent Document 1]

Japanese Unexamined Published Patent Application 2000-11723

In the meantime, in portable electronic devices such as a personal digital assistant and a hand-held game machine, the time for driving a battery greatly influences the usability. On this account, for the liquid crystal display device used as a display part for them, a single light type front light having only a single light emitting device 115 such as the front light 110 shown in FIG. 13A is used in order to achieve the realization of low power consumption in the front light. More specifically, the light emitting device is omitted to realize low power consumption.

However, in this single light type front light, it is almost impossible to uniformly and brightly illuminate a large area of a display screen having a size of a few inches or greater by combining a thin light guide plate with a single light emitting device. More specifically, in the front light 110 shown in FIG. 13A, in the case of the configuration that the light emitting device 115 is disposed on one side, the incident light first needs to be uniformized in the longitudinal direction of the side end surface of the light guide plate 112 by the intermediate light guide 113 in order to uniformly guide the light from the light emitting device 115 to the light guide. However, since it is difficult to uniformize the incident light into the light guide plate 112 by the intermediate light guide 113, it is extremely difficult to obtain uniform outgoing light throughout the front side of the light guide plate 112, thus sometimes causing the visibility of the liquid crystal display device to be reduced.

As described above, the demand for the front light using a single light emitting device as a light source is increasing, but a front light capable of uniformly and brightly illuminating a large area is not realized yet.

SUMMARY OF THE INVENTION

The invention has been made to solve the problem, and an object is to provide a lighting device capable of uniformly illuminating a large area.

In addition, an object of the invention is to provide a liquid crystal display device having the lighting device described above.

In order to achieve the objects, the invention adopts the configurations below.

A lighting device according to the invention is characterized by including:

a light guide plate;

a light guide disposed along a side end surface of the light guide plate; and a light emitting device disposed on an end surface of the light guide, wherein a plurality of wedge-shaped grooves seen in cross section extending in a thickness direction of the light guide is formed and arranged in a backside of the light guide on an opposite side of the light guide plate, a metal reflective film is formed on a side surface of the light guide, a pitch between the grooves is formed so as to be linearly varied with respect to a distance from the end surface disposed with the light emitting device to the groove, a depth of the groove is formed more deeply as the groove is positioned more apart from the end surface, and in a distribution of the depth of the groove with respect to the distance from the end surface disposed with the light emitting device to the groove, there are a first area where the depth of the groove is linearly increased with respect to the distance from the end surface to the groove, and a second area formed apart from the light emitting device more than the first area in which an increasing rate of the depth of the groove with respect to the distance from the end surface is greater than that in the first area.

With this configuration, the lighting device according to the invention can uniformly irradiate the light from the side surface of the light guide facing the side end surface of the light guide plate. Consequently, the distribution of an amount of outgoing light in the outgoing surface of the light guide plate can be uniformized. The light guided from the light emitting device disposed on the end surface of the light guide into the light guide and transmitting in the longitudinal direction of the light guide decays as it is apart from the light emitting device. Accordingly, in the invention, the depth of the grooves disposed for varying the direction of light transmission inside the light guide is optimized, and thus the distribution of an amount of outgoing light in the side surface of the light guide is optimized.

In the lighting device according to the invention, in two grooves adjacent to each other formed in the first area, a ratio of the depth of the groove formed on a side apart from the end surface to the depth of the other groove preferably ranges from 1 to 1.005. By setting the range, the event that an amount of reflected light is excessive to reduce the uniformity of outgoing light can be prevented in the first area formed on the side relatively close to the light emitting device.

In the lighting device according to the invention, in two grooves adjacent to each other formed in the second area, a ratio of the depth of the groove formed on a side apart from the end surface to the depth of the other groove preferably ranges from 1.005 to 1.015. By setting the range, an amount of reflected light by the grooves can be secured, and the uniformity of outgoing light can be prevented in the second area formed at the position relatively apart from the light emitting device.

In the lighting device according to the invention, in the first area, a distance x (mm) from the end surface disposed with the light emitting device and a depth y (μm) of the groove at a position thereof preferably satisfy expression $y=a_1x+b_1$, where $a_1$ ranges from 0 to 0.5, and $b_1$ ranges from 8.0 to 20.

In the lighting device according to the invention, in the second area, the depth of the groove is preferably given by a quadratic function, cubic function or exponential function of the groove and the distance from the groove to the end surface disposed with the light emitting device. With this configuration, an amount of reflected light by the grooves is secured in the second area formed at the position relatively apart from the light emitting device, and a light guide allowing uniform light irradiation onto the light guide plate can be obtained.

In the lighting device according to the invention, when a boundary on a side of the light emitting device in the second area is preferably positioned closer to the end surface than two-thirds of an overall length of the light guide, depth y (μm) of the groove and a distance x (mm) from the groove to the end surface disposed with the light emitting device satisfy the expression $y=a_2x^2+b_2$ in the second area, where $a_2$ ranges from 0.010 to 0.024, and $b_2$ ranges from −20 to 13.

In the lighting device according to the invention, when a boundary on a side of the light emitting device in the second area is preferably positioned further to the end surface than two-thirds of an overall length of the light guide, depth y (μm) of the groove and a distance x (mm) from the groove to the end surface disposed with the light emitting device satisfy the expression $y=a_3x^2+b_3x+c_3$ in the second area, where $a_3$ ranges from 0.050 to 0.080, $b_3$ ranges from −5.7 to −3.7, and $c_3$ ranges from 50 to 130.

In the lighting device according to the invention, in the first area and the second area, a depth y (μm) of the groove and a distance x (mm) from the groove to the end surface disposed with the light emitting device preferably satisfy expression $y=a_4x^3+b_4x^2+c_4x+d_4$, where $a_4$ ranges from 0.55 to 0.85, $b_4$ ranges from −0.055 to −0.026, $c_4$ ranges from 0.3 to 1.5, and $d_4$ ranges from 8.0 to 20.0.

In the lighting device according to the invention, in the distribution of the depth of the groove with respect to the distance from the end surface disposed with the light emitting device to the groove, there is a third area where the depth of the groove is constant irrespective of the distance from the end surface to the groove, and the third area is fine to be formed at a position apart from the light emitting device more than the first area and the second area.

In the lighting device according to the invention, a width of the light guide is 4 mm or greater, and the pitch between the grooves can be formed to be constant irrespective of the distance from the end surface disposed with the light emitting device or formed wider in accordance with the distance from the end surface.

In the lighting device, a pitch z (μm) of the groove and a distance x (mm) from the end surface disposed with the light emitting device preferably satisfy expression $z=a_5x+b_5$, where $a_5$ ranges from 0 to 14, and $b_5$ ranges from 180 to 250.

In the lighting device according to the invention, a width of the light guide is below 4 mm, and the pitch between the grooves can be formed narrower in accordance with the distance from the end surface disposed with the light emitting device.

In the lighting device, a pitch z (μm) of the groove and a distance x (mm) from the end surface disposed with the light emitting device preferably satisfy expression $z=a_6x+b_6$, where $a_6$ ranges from −14 to 0, and $b_6$ ranges from 280 to 350.

In the lighting device according to the invention, the groove is preferably formed into an isosceles triangle seen in cross section, and a vertex angle thereof is formed ranging from an angle of 95 to 120 degrees.

With this configuration, the light from the light emitting device can be emitted to the light guide plate side efficiently, and the light scattering property can be enhanced. Therefore, emission lines can be prevented from being generated in the light guide plate effectively.

Next, a liquid crystal display device according to the invention is characterized by including the lighting device according to the invention and a liquid crystal display unit. With this configuration, a liquid crystal display device allowing display of uniform brightness excellent in visibility can be provided by the lighting device according to the invention capable of uniformly illuminating a large area.

As described above in detail, the lighting device according to the invention is configured to include the light guide plate; the light guide disposed along the side end surface of the light guide plate; and the light emitting device disposed on the end surface of the light guide, wherein the plurality of the wedge-shaped grooves seen in cross section extending in the thickness direction of the light guide is formed and arranged in the backside of the light guide on the opposite side of the light guide plate, the metal reflective film is formed on a side surface of the light guide, the pitch between the grooves is formed so as to be linearly varied with respect to the distance from the end surface disposed with the light emitting device to the groove, the depth of the groove is formed more deeply as the groove is positioned more apart from the end surface, and in the distribution of the depth of the groove with respect to the distance from the end surface disposed with the light emitting device to the groove, there are the first area where the depth of the groove is linearly increased with respect to the distance from the end surface to the groove, and the second area formed apart from the light emitting device more than the first area in which an increasing rate of the depth of the groove with respect to the distance from the end surface is greater than that in the first area. Therefore, the light can be irradiated uniformly from the side surface of the light guide facing the side end surface of the light guide plate. Consequently, the distribution of an amount of outgoing light in the outgoing surface of the light guide plate can be uniformized.

In addition, according to the invention, the lighting device according to the invention described above and the liquid crystal panel are provided, and thus the liquid crystal display device allowing display of uniform brightness excellent in visibility can be provided by the lighting device according to the invention capable of uniformly illuminating a large area.

BRIEF DESCRIPTION OF THE DRAWINGS

The teachings of the invention can be readily understood by considering the following detailed description in conjunction with the accompanying drawings, in which.

DESCRIPTION OF THE PREFERRED EMBODIMENT

Hereafter, an embodiment of the invention will be described with reference to the drawings.

Figure 1:
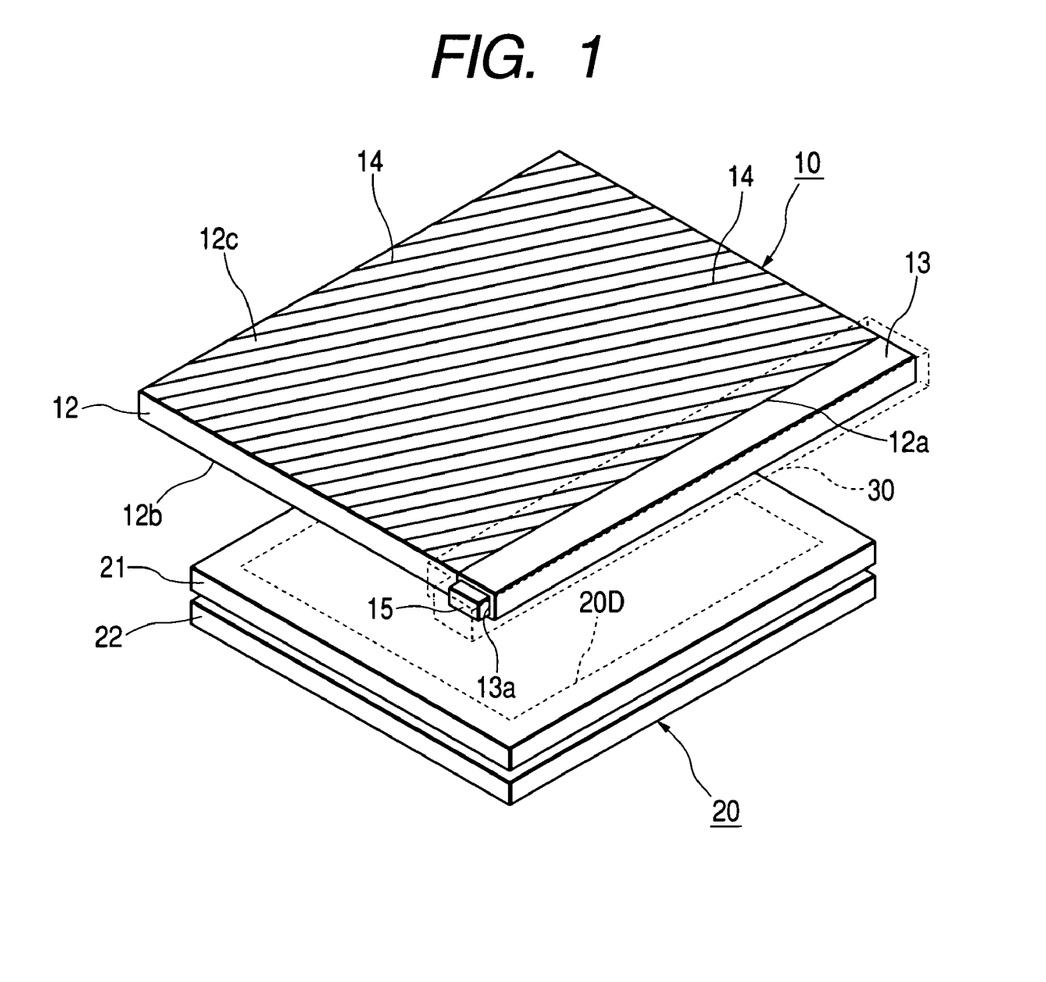
FIG. 1 is a perspective view illustrating a liquid crystal display device having a front light as an embodiment according to the invention.
Figure 2:
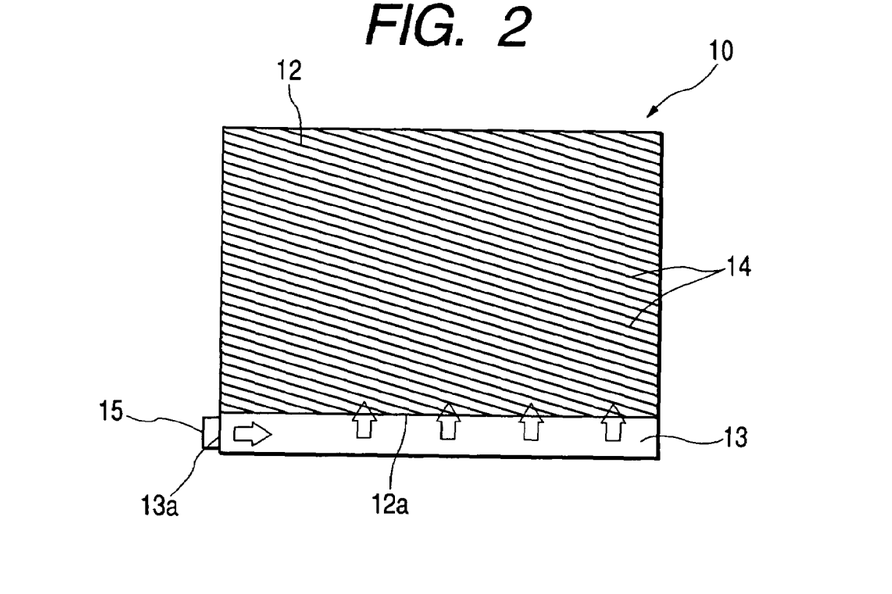
FIG. 2 is a plan view illustrating the front light shown in FIG. 1.
Figure 3:
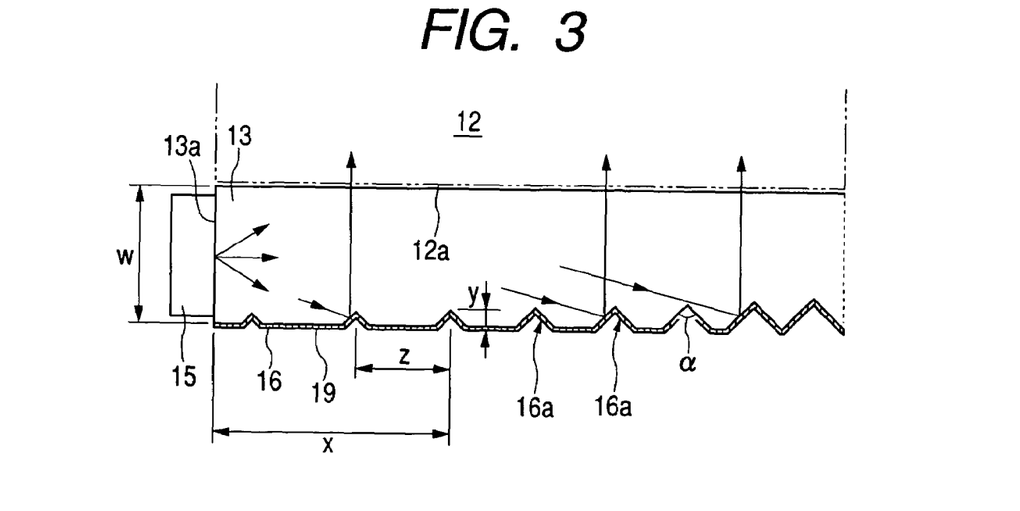
FIG. 3 is an enlarged plan view illustrating an intermediate light guide shown in FIG. 2.
Figure 4:
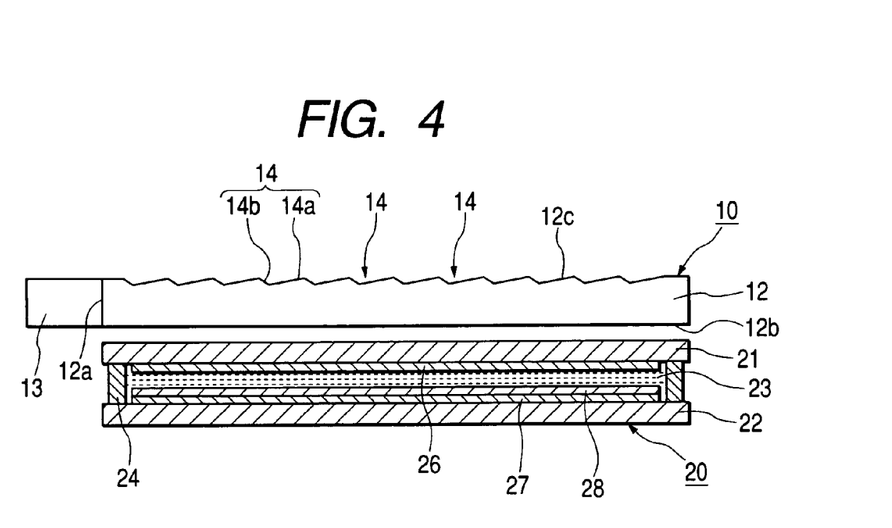
FIG. 4 is a cross section illustrating the liquid crystal display device shown in FIG. 1.

FIG. 1 is a perspective view illustrating a liquid crystal display device having a front light (lighting device) as an embodiment according to the invention, FIG. 2 is a plan view illustrating the front light shown in FIG. 1, FIG. 3 is an enlarged plan view illustrating an intermediate light guide shown in FIG. 2, and FIG. 4 is a cross section illustrating the liquid crystal display device shown in FIG. 1.

As shown in FIGS. 1 and 4, a front light 10 is configured of a light guide plate 12 of a nearly flat plate, an intermediate light guide (light guide) 13 disposed on a side end surface 12a thereof, a light emitting device 15 disposed on an end surface 13a on one side (the front side in the drawing) of the intermediate light guide 13, and a light blocking case 30 attached from the intermediate light guide 13 side so as to cover the intermediate light guide 13, the light emitting device 15 and the side end part of the light guide plate 12. In addition, as shown in FIG. 2, a plurality of prism grooves 14 is formed and arranged on the outer surface side (the top side) of the light guide plate 12 as tilting to the side end surface 12a disposed with the intermediate light guide 13.

As shown in FIG. 4, a liquid crystal display unit 20 is configured in which a liquid crystal layer 23 is sandwiched between an upper substrate 21 and a lower substrate 22 and is sealed by a sealing material 24. On the inner side (the liquid crystal layer 23 side) of the upper substrate 21, a liquid crystal control layer 26 including an electrode layer for applying voltage to the liquid crystal layer 23 and an alignment layer for controlling the alignment of liquid crystal molecules is formed. On the inner side (the liquid crystal layer 23 side) of the lower substrate 22, a reflective layer 27 including a reflective film made of a light reflective metal material such as Al or Ag and a liquid crystal control layer 28 are sequentially laminated. As similar to the liquid crystal control layer 26, the liquid crystal control layer 28 is configured to have an electrode layer and an alignment layer, and, in some cases, a switching device for switching the electrode layer. Furthermore, the configuration having a color filter in any one of the layers is acceptable.

Then, in the reflective liquid crystal display unit 20 having the configuration, a rectangular area 20D indicated by a dotted line shown in FIG. 1 is a display area. The light guide plate 12 of the front light 10 is disposed on the front side of the display area 20D.

In the liquid crystal display device having the configuration, light is transmitted from the light emitting device 15 to the light guide plate 12 through the intermediate light guide 13, and an outgoing surface 12b of the light guide plate 12 undergoes surface emission to illuminate the liquid crystal display unit 20. In the liquid crystal display unit 20, the light transmitted through the upper substrate 21 and the liquid crystal layer 23 is reflected by the reflective layer 27 of the lower substrate 22, and display light is emitted to the front side of the liquid crystal display device for display.

In the front light 10 of the embodiment, as shown in FIGS. 1 and 2, the prism grooves 14 in a prism surface 12c are formed in tilt so that they are oriented to cross the extending direction thereof with the side end surface 12a of the light guide plate 12. The tilt angle is properly changed in accordance with the pitch between the pixels of the liquid crystal display unit 20 to be assembled with the front light 10, but the prism grooves 14 are preferably formed so that the tilt angle ranges from an angle of 0 to 10 degrees. By setting this range, an excellent uniformity of the distribution of outgoing light can be obtained that is hard to generate moiré patterns.

Furthermore, as shown in FIG. 4, the prism groove 14 is formed of two slope parts 14a and 14b formed in tilt with respect to the outgoing surface 12b. The slope part formed nearly facing the intermediate light guide 13 is the steep slope part 14b, and the other is the gentle slope part 14a formed to have a relatively gentle tilt angle. It is fine to properly select the tilt angles of the slope parts 14a and 14b in accordance with the dimensions of the light guide plate 12. Not defined particularly, when the size of the light guide plate 12 is about 70 mm×50 mm, the tilt angle of the gentle slope part 14a is preferably an angle of about 1.5 to 2.6°, and the tilt angle of the steep slope part 14b is an angle of 40 to 45°. It is fine to form the pitch between the prism grooves 14 at a fixed pitch or variable pitch in the range of about 150 to 300 μm.

As materials for forming the light guide plate 12, transparent resin materials such as polycarbonate resins and epoxy resins and glass can be used other than acryl resins. Moreover, when specific examples are named, not defined particularly, however, ARTON (Trade Name, made by JSR Corporation) and ZEONOR (Trade Name, made by ZEON CORPORATION) are preferably named.

In addition, the light transmitting through the inside can be hard to leak outside as the plate thickness of the light guide plate 12 is formed thicker, and the distribution of an amount of outgoing light in the front light 10 can be uniformized. Therefore, preferably, the plate thickness is formed 0.8 mm or greater, more preferably, 1.0 mm or greater. Furthermore, since the brightness of the front light tends to reduce when the plate thickness is 1.5 mm or greater, it is fine that the upper limit of the plate thickness is 1.5 mm in view of reducing the front light 10 in thickness as well.

The intermediate light guide 13 is a square pole-shaped transparent member along the side end surface 12a of the light guide plate 12, and the light emitting device 15 is disposed at the side end surface thereof. FIG. 3 is an enlarged plan view illustrating the intermediate light guide 13. As shown in the drawing, a backside (the side surface opposite to the light guide plate 12) 16 of the intermediate light guide 13 is a prism surface where a plurality of wedge-shaped grooves 16a seen in cross section extends in parallel each other in the thickness direction of the intermediate light guide 13. The light emitted from the light emitting device 15 is transmitted into the intermediate light guide 13 in the longitudinal direction thereof, reflected on the inner side of the slope parts forming the wedge-shaped grooves 16a, and emitted to the light guide plate 12. As shown in FIG. 3, the wedge-shaped grooves 16a are generally formed to have a greater depth y of the groove as they are at the positions more apart from the light emitting device 15, and a pitch z between the grooves 16a and 16a is generally formed narrower as they are more apart from the light emitting device 15. With this configuration, the intermediate light guide 13 of the embodiment can uniformly irradiate light onto the side end surface 12a of the light guide plate 12.

Figure 5:
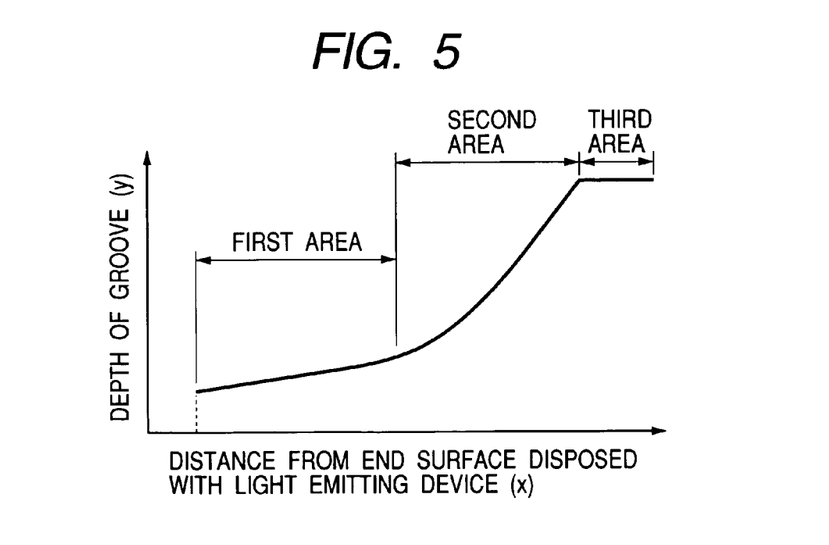
FIG. 5 is an explanatory diagram illustrating the distribution of a depth y of grooves shown in FIG. 3.
Figure 6:
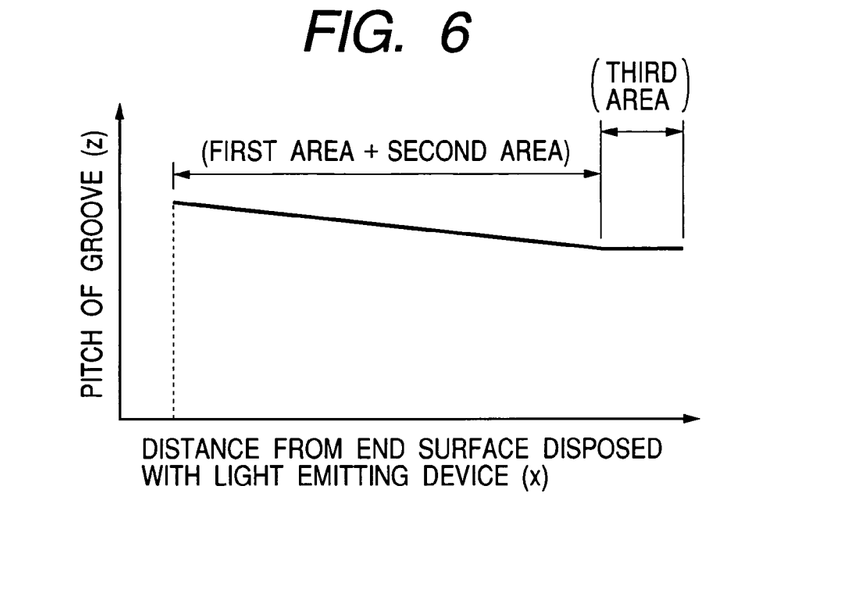
FIG. 6 is an explanatory diagram illustrating the distribution of a pitch z between the grooves shown in FIG. 3.

FIG. 5 is an explanatory diagram illustrating the distribution of the depth y of the wedge-shaped grooves 16a shown in FIG. 3 formed in the intermediate light guide 13 in the longitudinal direction of the intermediate light guide 13, and FIG. 6 is an explanatory diagram illustrating the distribution of the pitch z between the grooves. In the distribution of the depth y of the wedge-shaped grooves 16a shown in FIG. 5, the area on the side relatively close to the end surface 13a is a first area where the depth y of the groove is gently increased with respect to a distance x from the end surface 13a. In a second area continuous from the first area, the increasing rate of the depth y of the groove with respect to the distance x is greater than that in the first area. Then, in a third area continuous from the second area, the depth y of the groove is formed to be constant irrespective of the distance x.

In addition, in the distribution of the pitch z between the grooves shown in FIG. 6, the pitch z between the grooves is formed narrower linearly with respect to the distance x from the end surface 13a.

In the intermediate light guide 13 of the embodiment, a plurality of the wedge-shaped grooves 16a is arranged along the distributions shown in FIGS. 5 and 6 to uniformize the distribution of an amount of outgoing light in the longitudinal direction of the light guide 13. In the area (the first area) close to the light emitting device 15 and having a large amount of light transmitting inside the intermediate light guide 13, the depth y of the groove is formed shallow and the increasing rate of the depth of the groove with respect to the distance x is set low, and the pitch z between the grooves is formed wide. Thus, the ratio of light reflected by the slope parts forming the grooves 16a and emitted to the light guide plate 12 is reduced, and much more light is transmitted in the longitudinal direction of the light guide 13. Correspondingly, in the area (the second area) apart from the light emitting device 15 and having a reduced amount of light transmitting, the depth y of the groove is formed deep, the increasing rate of the depth of the groove with respect to the distance x is set greater than that of the first area, and the pitch z between the grooves is formed narrow. Thus, the ratio of light reflected by each of the grooves 16a is grown, and the number of the grooves 16a is increased to raise the ratio of light emitted to the light guide plate 12.

More specifically, in the first area, a ratio $y_{m+1}/y_m$ of a depth $y_m$ of the mth groove 16a to a depth $y_{m+1}$ of the (m+1)th groove 16a from the end part 13a preferably ranges from 1 to 1.005. In addition, in the second area, a ratio $y_{n+1}/y_n$ of a depth $y_n$ of the nth groove 16a to a depth $y_{n+1}$ of the (n+1)th groove 16a from the end part 13a preferably ranges 1.005 to 1.015. The increasing rate of the depth y of the groove in each area is controlled as described above to arrange the grooves 16a. Therefore, an amount of outgoing light in the first area can be balanced with an amount of outgoing light in the second area, and thus the distribution of an amount of outgoing light from the intermediate light guide 13 can be uniformized.

When the distribution of the depth y of the groove in the first area is defined more detailedly, the depth y (μm) is preferably expressed by a linear function of the distance x (mm) from the end surface 13a to the groove, and x and y satisfy $$y = a_1 x + b_1 \qquad \text{(Expression 1)},$$

where $a_1$ preferably ranges from 0 to 0.5, and $b_1$ ranges from 8.0 to 20 in Expression 1. Constants $a_1$ and $b_1$ are set within the ranges to allow variations in an amount of outgoing light in the first area to be suppressed 10% or below.

Furthermore, in the second area, the depth y of the groove is preferably expressed by a quadratic function, cubic function or exponential function of the distance x from the end surface 13a.

In the case where the depth y of the groove (μm) is expressed by the quadratic function of the distance x (mm), it is varied depending on the position where the second area is formed in the longitudinal direction of the light guide 13. When the distance from the end of the second area on the light emitting device 15 side to the end surface 13a is below 40 mm, x and y satisfy $$Y = a_2 x^2 + b_2 \qquad \text{(Expression 2)},$$

where $a_2$ preferably ranges from 0.010 to 0.024, and $b_2$ ranges from −20 to 13 in Expression 2.

Moreover, when the distance from the end of the second area to the end surface 13a is 40 mm or greater, x and y satisfy $$Y = a_3 x^2 + b_3 x + c_3 \qquad \text{(Expression 3)}$$

where $a_3$ preferably ranges from 0.050 to 0.080, $b_3$ ranges from −5.7 to −3.7 and $c_3$ ranges from 50 to 130 in Expression 3.

Additionally, in the invention, Expressions 2 and 3 are shown for the cases where the distance from the end of the second area to the end surface 13a is below 40 mm and 40 mm or greater, respectively, but they are examples. It is fine to determine whether to apply Expression 2 or Expression 3 depending on whether the distance from the position of the end of the second area on the light emitting device side to the end surface 13a is two-thirds of the overall length of the intermediate light guide 13.

Furthermore, in the first and second area, when the depth y (μm) of the groove is expressed by the cubic function of the distance x (mm), x and y satisfy $$y = a_4 x^3 + b_4 x^2 + c_4 x + d_4 \qquad \text{(Expression 4)}$$

where $a_4$ preferably ranges from 0.55 to 0.85, $b_4$ ranges from −0.055 to −0.026, $c_4$ ranges from 0.3 to 1.5, and $d_4$ ranges from 8.0 to 20.0 in Expression 4.

Moreover, when the depth y (μm) of the groove is expressed by the exponential function of the distance x (mm), x and y satisfy $$y = a_7 \exp(b_7 x) \qquad \text{(Expression 5)}$$

where $a_7$ preferably ranges from 8 to 15, and $b_7$ ranges from 0.025 to 0.031 in this Expression.

Then, by setting each of the constants in the ranges, variations in an amount of outgoing light in the second area can be suppressed 15% or below, and an intermediate light guide excellent in the uniformity of an amount of outgoing light can be obtained.

In addition, the relationship between the distance x (mm) from the end surface to the groove and the depth y (μm) in the first area and the second area is not defined by Expressions 1 to 5. The depth y of the groove with respect to the distance x from the end surface 13a can be expressed by any of the relational expressions when the increasing rate of the depth in each area is controlled within the ranges above. More specifically, it is acceptable that the depth y of the groove is expressed by the quadratic function of the distance x from the end surface 13a in the first area and is expressed by a higher-order function in the second area.

The third area shown in FIG. 5 is the area where the depth of the grooves 16a formed at the positions apart from the light emitting device 15 more than the second area is formed to be constant. The third area is not necessarily required in the lighting device according to the invention, but there is the case where the depth of the grooves needs to be constant for the constraint of a mold for fabricating the light guide 13 or the process for fabricating the depth of the groove 16a or the pitch between them. In the light guide 13 according to the invention, the area where the depth of the grooves is constant is formed at the position apart from the end surface 13a disposed with the light emitting device 15 more than the first area and the second area. In addition, the third area is preferably 15% or below in the longitudinal direction of the light guide 13. With this configuration, an amount of outgoing light is not reduced significantly in the third area, and a uniform distribution of an amount of outgoing light can be obtained in the longitudinal direction of the light guide 13.

Furthermore, in the intermediate light guide 13 of the embodiment, the pitch z between the grooves has the distribution where it is linearly narrowed with respect to the distance x from the end surface 13a to the groove in the first area and second area in the distribution of the depth of the groove. In the area corresponding to the third area in the distribution of the depth of the groove, a constant groove pitch is formed irrespective of the distance x.

In the embodiment, the pitch z between the grooves is configured to have the distribution where it is linearly narrowed with respect to the distance x from the end surface 13a. However, the pitch z between the grooves is properly changed in accordance with the width W of the intermediate light guide 13 and the distribution of the depth y of the groove shown in FIG. 5, and is set so as to uniformize the distribution of an amount of outgoing light. Depending on the circumstances, it is fine that the pitch is formed to be gradually wider with respect to the distance x from the end surface 13a or constant with respect to the distance x. However, in any cases, the pitch is formed to have the linear distribution with respect to the distance x from the end surface.

In the area corresponding to the third area in the distribution of the depth of the groove, the pitch z between the grooves is constant irrespective of the distance x, but the area is not necessarily required as similar to the third area in the distribution of the depth of the groove.

Preferably, the pitch z between the grooves is expressed by the linear function of the distance x from the end surface 13a in the areas corresponding to the first and second areas in the distribution of the depth of the groove.

Preferably, in the relationship between the distance x (mm) and the pitch z (μm), different expressions are applied depending on the width W of the intermediate light guide 13 shown in FIG. 3. More specifically, when the width W is 4 mm or greater, satisfying $$Z = a_5 x + b_5 \qquad \text{(Expression 6)}$$

where $a_5$ preferably ranges 0 to 14, and $b_5$ ranges 180 to 250 in this Expression. When the width W is below 4 mm, satisfying $$Z = a_6 x + b_6 \qquad \text{(Expression 7)}$$

where $a_6$ preferably ranges −14 to 0, and $b_6$ ranges from 280 to 350 in this Expression.

More specifically, as shown in Expressions 6 and 7, when the width W of the light guide 13 is 4 mm or greater, the pitch z between the grooves has the distribution where it is constant or linearly wider as the distance x becomes greater. When the width W is below 4 mm, the pitch has the distribution where it is constant or linearly narrower as the distance x becomes greater.

In the intermediate light guide 13 of the embodiment, the shape of the wedge-shaped grooves 16a formed in the backside 16 shown in FIG. 3 is preferably formed into an isosceles triangle seen in cross section, and a vertex angle α thereof preferably ranges from an angle of 95 to 120°. The uniformity of brightness is reduced when the vertex angle a is below an angle of 95°, whereas brightness is reduced when it exceeds an angle of 120°.

In the backside 16 of the intermediate light guide where the grooves 16a are formed, the reflective film 19 made of a high reflectance metal thin film such as Al or Ag is formed, and the reflectance of the backside 16 is enhanced by the reflective film 19 to increase the light quantity emitted to the light guide plate 12.

For the intermediate light guide 13, transparent resin materials such as polycarbonate resins and epoxy resins and glass can be used other than acryl resins. Additionally, the light emitting device 15 is not defined particularly when it can be disposed on the end surface 13a of the intermediate light guide 13 and illuminate the end surface 13a; a white LED (Light Emitting Diode) and an organic electroluminescent device can be used.

Furthermore, as shown in FIG. 1, on the intermediate light guide 13 side of the front light 10, the light blocking case 30 is attached. On the inner side of the case 30, a reflective film made of a high reflectance metal thin film such as Al or Ag, not shown, is formed. The light leaking from the intermediate light guide 13 and the side end part of the light guide plate 12 to the outside is reflected by the reflective film, it is again incident into the light guide plate 12 or intermediate light guide 13, and thus it can be utilized as luminous light. According to this structure, the front light 10 of the embodiment can efficiently utilize the light from the light emitting device 15 and can illuminate the liquid crystal display unit 20 in high brightness.

Moreover, the case where the reflective film is disposed on the inner side of the case 30 is described above, but the other configurations can be adapted not limiting this when the structure is provided that the light leaking from the intermediate light guide 13 is reflected. For example, it is fine to form the case 30 itself of a reflective metal material. It is acceptable that a reflective metal thin film is deposited on the intermediate light guide 13 and the side end part of the light guide plate 12 by a deposition method such as sputtering and the light is prevented from leaking from the intermediate light guide 13 and the side end part of the light guide plate 12.

According to the intermediate light guide 13 of the embodiment having the configuration above, the wedge-shaped grooves 16a formed and arranged in the longitudinal direction of the backside 16 can uniformly emit light incident from the light emitting device 15 thorough the end surface 13a to the light guide plate 12. Consequently, the uniformity of luminous light emitted from the outgoing surface of the light guide plate 12 to the liquid crystal display unit 20 can be improved as well.

Therefore, according to the liquid crystal display device 20 having the front light 10 of the invention, display of high brightness and uniform brightness can be obtained also in performing reflective display where the front light 10 is lit, without saying that the outside light is utilized to perform reflective display.

EXAMPLE

Hereafter, the invention will be described more detailedly by examples.

Figure 7:
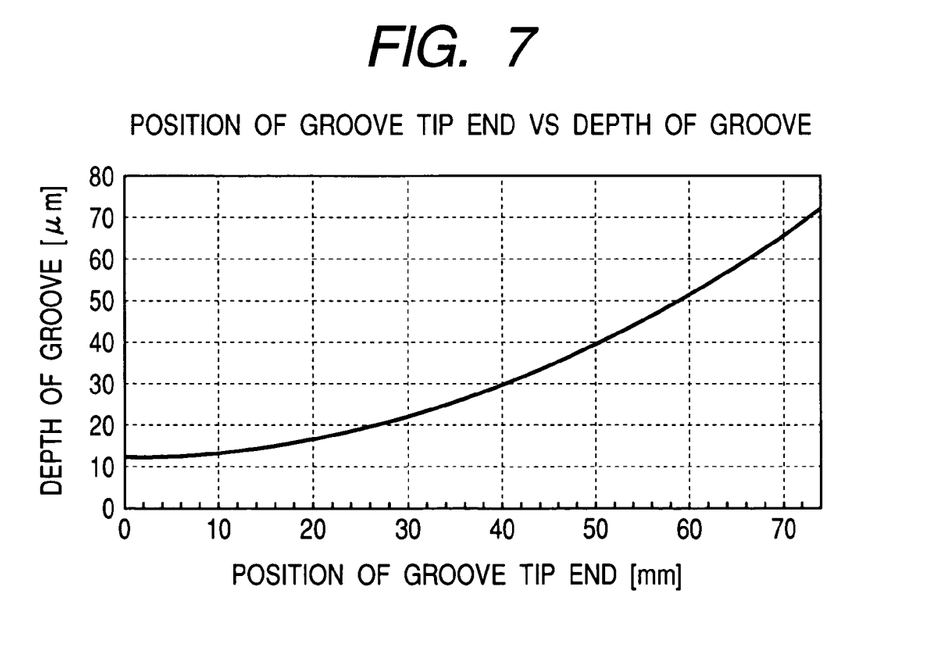
FIG. 7 is a graph illustrating the distribution of the depth of the grooves obtained by optimizing the distribution of an amount of outgoing light in a light guide having a width of 4.8 mm.
Figure 8:
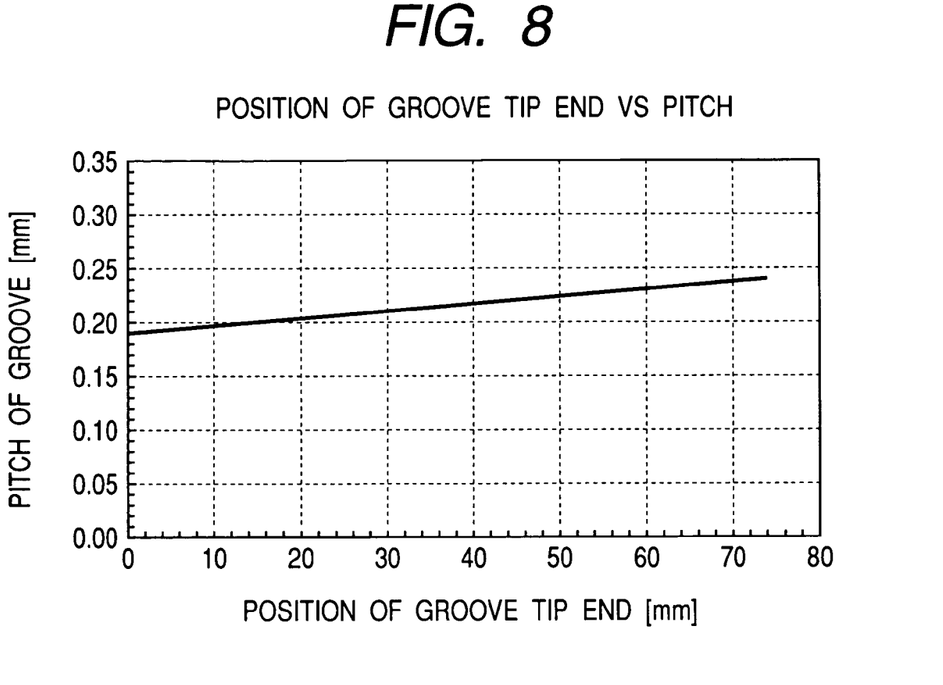
FIG. 8 is a graph illustrating the distribution of the pitch between the grooves obtained by optimizing the distribution of an amount of outgoing light in the light guide having a width of 4.8 mm.
Figure 9:
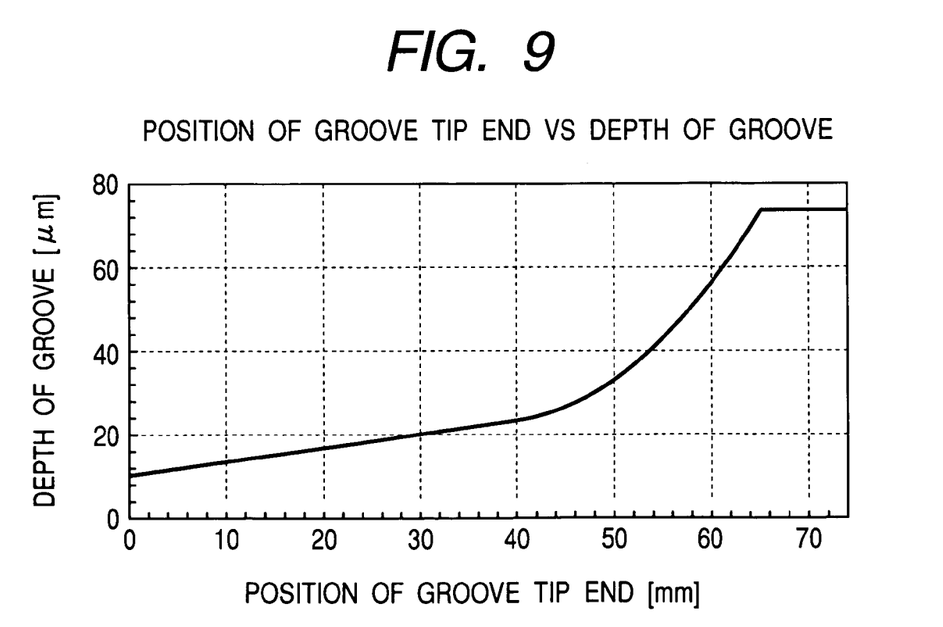
FIG. 9 is a graph illustrating the distribution of the depth of the grooves obtained by optimizing the distribution of an amount of outgoing light in a light guide having a width of 4.0 mm.
Figure 10:
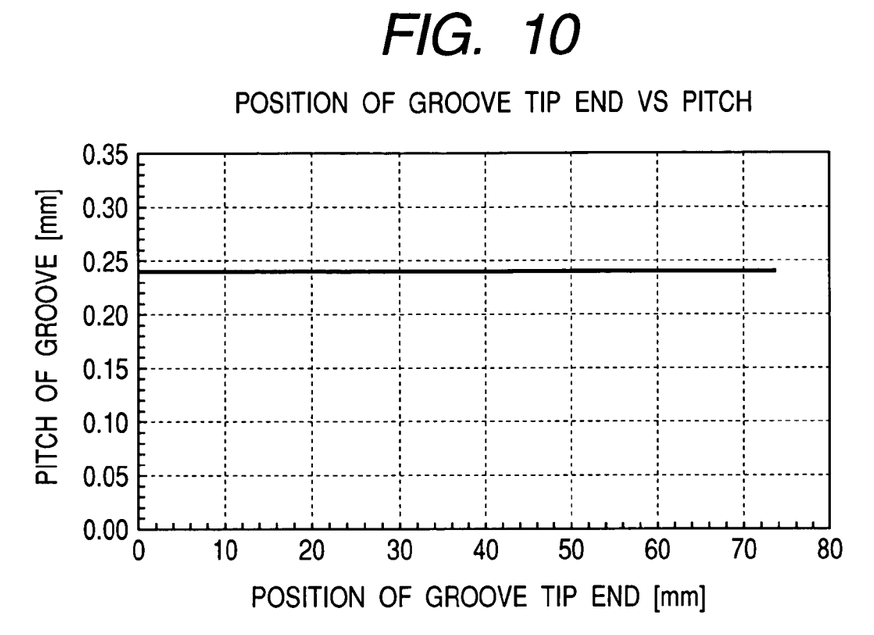
FIG. 10 is a graph illustrating the distribution of the pitch between the grooves obtained by optimizing the distribution of an amount of outgoing light in the light guide having a width of 4.0 mm.
Figure 11:
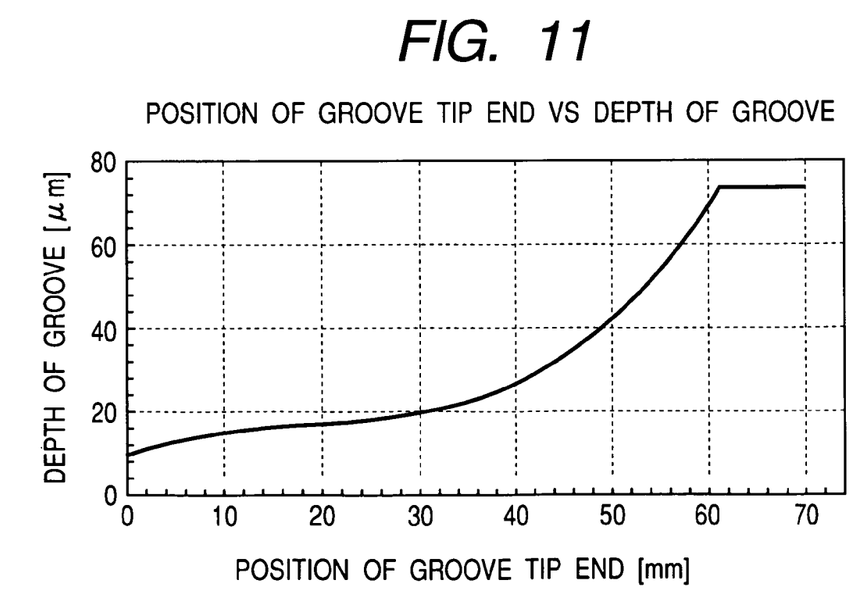
FIG. 11 is a graph illustrating the distribution of the depth of the grooves obtained by optimizing the distribution of an amount of outgoing light in a light guide having a width of 3.0 mm.
Figure 12:
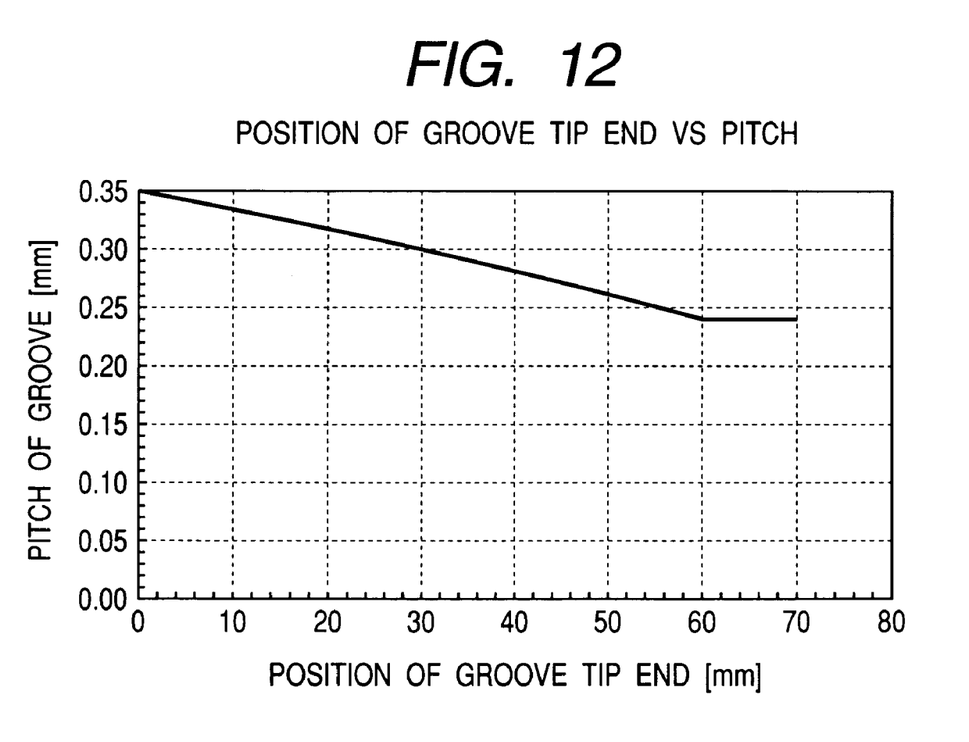
FIG. 12 is a graph illustrating the distribution of the pitch between the grooves obtained by optimizing the distribution of an amount of outgoing light in the light guide having a width of 3.0 mm.

In the examples, an amount of outgoing light in the longitudinal direction of the intermediate light guide 13 shown in FIG. 3 was optimized, and the distributions of the depth and pitch between the grooves 16a that can obtain a uniform distribution of an amount of outgoing light were derived by calculation. FIGS. 7 and 8 are graphs illustrating examples where the distribution of the depth and the distribution of the pitch between the grooves 16a are optimized, respectively, in the case where the width W of the light guide 13 shown in FIG. 3 was 4.8 mm. FIGS. 9 and 10 depict the case where the width W was 4.0 mm, and FIGS. 11 and 12 depict the case where the width W was 3.0 mm.

In obtaining the distribution of the depth of the groove and the distribution of the pitch between the grooves by calculation, the dimensions of the intermediate light guide 13 were 68 mm (L)×3 mm (W)×0.9 mm (t), and the dimensions of the light guide plate 12 were 68 mm (L)×49.4 mm (W)×0.975 mm (t). In addition, the shape of each of the wedge-shaped grooves 16a was an isosceles triangle having a vertex angle of 110° in common, where the depth of the grove was the distance from the backside 16 of the light guide 13 to the bottom apex of the groove 16a and the pitch between the grooves 16a was the distance between the adjacent grooves 16a and 16a. Furthermore, the metal reflective film was supposed to be formed on the backside 16 of the light guide 13, and the reflectance was considered to be 100% for calculation.

Moreover, the depth of the groove 16a was varied in the range of 9.56 to 73.5 µm, and the pitch between the grooves was varied in the range of 0.346 to 0.24 µm.

First, in the case where the width W of the light guide 13 was 4.8 mm, as shown in FIG. 7, the depth of the groove was increased almost linearly at the position very close to the light emitting device 15 with respect to the distance from the light emitting device in the distribution of the depth of the groove (first area), and after that the depth of the groove was increased in a quadratic curve in the distribution (second area). In FIG. 7, when a function of the distance x and the depth y of the groove was determined by fitting the graph, Expression $y=(0.1092\times10^{-2})x^2+12$ was obtained.

In addition, the distribution of the pitch between the grooves shown in FIG. 8 is the distribution where the pitch is linearly wider with respect to the distance from the light emitting device 15. When a relational expression between the pitch z between the grooves and the distance x was derived from the graph, Expression $z=(6.8027\times10^{-4})x+0.19$ was obtained.

Next, in the case where the width W of the light guide 13 was 4.0 mm, as shown in FIG. 9, the depth of the groove was increased almost linearly with respect to the distance from the light emitting device in the range that the distance x is about 0 to 40 mm in the distribution of the depth of the groove (first area), and after that, the depth of the groove was increased in a quadratic curve in the distribution (second area). Furthermore, the depth of the groove is constant in the area where the distance x is 65 mm or greater. This is because the maximum depth was set to 73.5 µm for the constraint in practical fabrication. In FIG. 9, when a function of the distance x and the depth y of the groove was determined by fitting the graph, Expression $y=0.3288x+10.082$ was obtained in the first area where the depth of the groove is varied linearly with respect to the distance (in the range that the distance x is 0 to 40 mm), and Expression $y=0.06685x^2-5.019x+117.034$ was obtained in the second area where the increasing rate of the depth of the groove is greater than that in the first area (in the range that the distance x is 40 to 65 mm).

Moreover, as shown in FIG. 10, the distribution of the pitch between the grooves was constant at 0.24 µm irrespective of the distance from the light emitting device 15.

Next, in the case where the width W of the light guide 13 was 3.0 mm, as shown in FIG. 11, the depth of the groove was increased almost linearly with respect to the distance from the light emitting device in the range that the distance x was about 10 to 30 mm in the distribution of the depth of the groove (first area), and the depth of the groove was increased more steeply in the range that the distance x was about 30 to 60 mm in the distribution (second area). In addition, the depth of the groove is constant in the area where the distance x is 61 mm or greater. This is because the maximum depth of the groove was set to 73.5 µm for the constraint in practical fabrication. In FIG. 11, when a function of the distance x and the depth y of the groove was determined by fitting the graph, Expression $y=0.00064192x^3-0.03537x^2+0.81638x+9.55372$ was obtained in the area combining the first area with the second area (in the range that the distance x was 0 to 61 mm).

Furthermore, as shown in FIG. 12, the distribution of the pitch between the grooves is the distribution where the pitch is linearly narrowed with respect to the distance from the light emitting device 15. When a relational expression between the pitch z between the grooves and the distance x was derived from the graph, Expression z=−0.0017x+0.3491 was obtained.

As described above, when the wedge-shaped grooves are formed in the backside 16 of the intermediate light guide 13 so as to satisfy the requirements of the invention described above which were derived from the distribution of the depth of the groove and the distribution of the pitch between the grooves for optimizing the distribution of an amount of outgoing light shown in FIGS. 7 to 12, the distribution of an amount of outgoing light in the longitudinal direction of the light guide 13 can be uniformized. It can be said that the front light capable of providing uniform luminous light by guiding light to the light guide plate 12 through the intermediate light guide 13 can be obtained.

What is claimed is:

1. A lighting device comprising:
   a light guide plate;
   a light guide disposed along a side end surface of the light guide plate; and
   a light emitting device disposed on an end surface of the light guide,
   wherein a plurality of wedge-shaped grooves seen in cross section extending in a thickness direction of the light guide is formed and arranged in a backside of the light guide on an opposite side of the light guide plate,
   a metal reflective film,
   in a distribution of a pitch between the grooves with respect to a distance from the end surface disposed with the light emitting device to groove, the pitch between the grooves is constant or linearly varied with respect to the distance from the end surface disposed with the light emitting device to the groove,
   a depth of the groove is formed more deeply as the groove is positioned more distal from the end surface,
   in a distribution of the depth of the groove with respect to the distance from the end surface disposed with the light emitting device to the groove, there is a first area where the depth of the groove is constant or linearly increased with respect to the distance from the end surface to the groove, and a second area formed more distal from the light emitting device than the first area in which an increasing rate of the depth of the groove with respect to the distance from the end surface is greater than that in the first area, and
   in two grooves adjacent to each other formed in at least one of the first and second area, a ratio of the depth of the groove formed on a side apart from the end surface to the depth of the other groove ranges from 1 to 1.005.

2. The lighting device according to claim 1, wherein in two grooves adjacent to each other formed in the first area, a ratio of the depth of the groove formed on a side apart from the end surface to the depth of the other groove ranges from more than 1 to less than 1.005.

3. The lighting device according to claim 1, wherein in two grooves adjacent to each other formed in the second area, a ratio of the depth of the groove formed on a side apart from the end surface to the depth of the other groove ranges from 1.005 to 1.015.

4. The lighting device according to claim 1, wherein in the first area, a distance x (mm) from the end surface disposed with the light emitting device and a depth y (μm) of the groove at a position thereof satisfy expression $y=a_1x+b_1$, where $a_1$ is larger than 0 and less than 0.5, and $b_1$ ranges from 8.0 to 20.

5. The lighting device according to claim 1, wherein in the second area, the depth of a groove is given by a quadratic function, cubic function or exponential function of the depth of the groove and the distance from the groove to the end surface disposed with the light emitting device.

6. The lighting device according to claim 5, wherein the distance from a position of an end of the second area on the light emitting device side to the end surface disposed with the light emitting device is less than 40 mm or less than two-thirds of an overall length of the intermediate light guide, and
   a depth y (μm) of the groove and a distance x (mm) from the groove to the end surface disposed with the light emitting device satisfy expression $y=a_2x^2+b_2$, where $a_2$ ranges from 0.010 to 0.024, and $b_2$ ranges from −20 to 13.

7. The lighting device according to claim 5, wherein the distance from a position of an end of the second area on the light emitting device side to the end surface disposed with the light emitting device is greater than 40 mm or greater than two-thirds of an overall length of the intermediate light guide, and
   a depth y (μm) of the groove and a distance x (mm) from the groove to the end surface disposed with the light emitting device satisfy expression $y=a_3x^2+b_3x+c_3$, where $a_3$ ranges from 0.050 to 0.080, $b_3$ ranges from −5.7 to −3.7, and $c_3$ ranges from 50 to 130.

8. The lighting device according to claim 5, wherein in the first area and the second area, a depth y (μm) of the groove and a distance x (mm) from the groove to the end surface disposed with the light emitting device satisfy expression $y=a_4x^3+b_4x^2+c_4x+d_4$, where $a_4$ ranges from 0.55 to 0.85, $b_4$ ranges from −0.055 to −0.026, $c_4$ ranges from 0.3 to 1.5, and $d_4$ ranges from 8.0 to 20.

9. The lighting device according to claim 1, wherein in the distribution of the depth of the groove with respect to the distance from the end surface disposed with the light emitting device to the groove, there is a third area where the depth of the groove is constant irrespective of the distance from the end surface to the groove, and
   the third area is formed at a position more distal from the light emitting device than the first area and the second area.

10. The lighting device according to claim 1, wherein a width of the light guide is 4 mm or greater, and
    the pitch between the grooves is formed to be constant irrespective of the distance from the end surface disposed with the light emitting device or formed wider in accordance with the distance from the end surface.

11. The lighting device according to claim 10, wherein a pitch z (μm) of the groove and a distance x (mm) from the end surface disposed with the light emitting device satisfy expression $z=a_5x+b_5$, where $a_5$ is larger than 0 and less than 14, and $b_5$ ranges from 180 to 250.

12. The lighting device according to claim 10, wherein the pitch between adjacent grooves is linearly widened as the distance between the adjacent grooves and the end surface disposed with the light emitting device is increased.

13. The lighting device according to claim 1, wherein a width of the light guide is below 4 mm, and
    the pitch between the grooves is formed narrower in accordance with a distance from the end surface disposed with the light emitting device.

14. The lighting device according to claim 13, wherein a pitch z (μm) of the groove and a distance x (mm) from the end surface disposed with the light emitting device satisfy expression $z=a_6x+b_6$, where $a_6$ ranges from −14 to 0, and $b_6$ ranges from 280 to 350.

15. The lighting device according to claim 1, wherein the groove is formed into an isosceles triangle seen in cross section, and a vertex angle thereof is formed ranging from an angle of 95 to 120 degrees.

16. The lighting device according to claim 1, wherein the reflective metal film is formed on a side surface of the light guide.

17. The lighting device according to claim 1, further comprising a case covering the light guide and the light emitting device, wherein the reflective metal film is formed on a inner side of the case.

18. A liquid crystal display device comprising:
the lighting device according to claim 1; and
a liquid crystal panel.

19. A lighting device comprising:
a light guide plate;
a light guide disposed along a side end surface of the light guide plate; and
a light emitting device disposed on an end surface of the light guide,
wherein a plurality of wedge-shaped grooves seen in cross section extending in a thickness direction of the light guide is formed and arranged in a backside of the light guide on an opposite side of the light guide plate,
a metal reflective film,
in a distribution of a pitch between the grooves with respect to a distance from the end surface disposed with the light emitting device to groove, the pitch between the grooves is linearly varied with respect to the distance from the end surface disposed with the light emitting device to the groove,
a depth of the groove is formed more deeply as the groove is positioned more distal from the end surface,
in a distribution of the depth of the groove with respect to the distance from the end surface disposed with the light emitting device to the groove, there are a first area where the depth of the groove is linearly increased with respect to the distance from the end surface to the groove, and a second area formed more distal from the light emitting device than the first area in which an increasing rate of the depth of the groove with respect to the distance from the end surface is greater than that in the first area, and
in the first area, a distance x (mm) from the end surface disposed with the light emitting device and a depth y (μm) of the groove at a position thereof satisfy expression $y=a_1x+b_1$, where $a_1$ is larger than 0 and less than 0.5, and $b_1$ ranges from 8.0 to 20.

20. A lighting device comprising:
a light guide plate;
a light guide disposed along a side end surface of the light guide plate; and
a light emitting device disposed on an end surface of the light guide,
wherein a plurality of wedge-shaped grooves seen in cross section extending in a thickness direction of the light guide is formed and arranged in a backside of the light guide on an opposite side of the light guide plate,
a metal reflective film,
in a distribution of a pitch between the grooves with respect to a distance from the end surface disposed with the light emitting device to groove, the pitch between the grooves is linearly varied with respect to the distance from the end surface disposed with the light emitting device to the groove,
a depth of the groove is formed more deeply as the groove is positioned more distal from the end surface,
in a distribution of the depth of the groove with respect to the distance from the end surface disposed with the light emitting device to the groove, there are a first area where the depth of the groove is linearly increased with respect to the distance from the end surface to the groove, and a second area formed more distal from the light emitting device than the first area in which an increasing rate of the depth of the groove with respect to the distance from the end surface is greater than that in the first area,
in the second area, the depth of the groove is given by a quadratic function, cubic function or exponential function of the groove and the distance from the groove to the end surface disposed with the light emitting device,
the distance from a position of an end of the second area on the light emitting device side to the end surface disposed with the light emitting device is smaller than two-thirds of an overall length of the intermediate light guide, and
a depth y (μm) of the groove and a distance x (mm) from the groove to the end surface disposed with the light emitting device satisfy expression $y=a_2x^2+b_2$ or $y=a_3x^2+b_3x+c_3$ or $y=a_4x^3+b_4x^2+c_4x+d_4$ where $a_2$ ranges from 0.010 to 0.024, $b_2$ ranges from −20 to 13, $a_3$ ranges from 0.050 to 0.080, $b_3$ ranges from −5.7 to −3.7, $c_3$ ranges from 50 to 130, $a_4$ ranges from 0.55 to 0.85, $b_4$ ranges from −0.055 to −0.026, $c_4$ ranges from 0.3 to 1.5, and $d_4$ ranges from 8.0 to 20.

21. A lighting device comprising:
a light guide plate;
a light guide disposed along a side end surface of the light guide plate; and
a light emitting device disposed on an end surface of the light guide,
wherein a plurality of wedge-shaped grooves seen in cross section extending in a thickness direction of the light guide is formed and arranged in a backside of the light guide on an opposite side of the light guide plate,
a metal reflective film,
in a distribution of a pitch between the grooves with respect to a distance from the end surface disposed with the light emitting device to groove, the pitch between the grooves is linearly varied with respect to the distance from the end surface disposed with the light emitting device to the groove,
in a distribution of the depth of the groove with respect to the distance from the end surface disposed with the light emitting device to the groove, there is a first area where the depth of the groove is constant or increasing with respect to the distance from the end surface to the groove, and a second area formed more distal from the light emitting device than the first area in which an increasing rate of the depth of the groove with respect to the distance from the end surface is greater than that in the first area,
in the second area, the depth of the groove is given by a quadratic function, cubic function or exponential function of the groove and the distance from the groove to the end surface disposed with the light emitting device,
in the distribution of the depth of the groove with respect to the distance from the end surface disposed with the light emitting device to the groove, there is a third area where the depth of the groove is constant irrespective of the distance from the end surface to the groove, and the third area is formed at a position more distal from the light emitting device than the first area and the second area.

22. A lighting device comprising:

a light guide plate;

a light guide disposed along a side end surface of the light guide plate; and a light emitting device disposed on an end surface of the light guide, wherein a plurality of wedge-shaped grooves seen in cross section extending in a thickness direction of the light guide is formed and arranged in a backside of the light guide on an opposite side of the light guide plate, in a distribution of a pitch between the grooves with respect to a distance from the end surface disposed with the light emitting device to groove, a depth of the groove is formed more deeply as the groove is positioned more distal from the end surface, in a distribution of the depth of the groove with respect to the distance from the end surface disposed with the light emitting device to the groove, there are a first area where the depth of the groove is linearly increased with respect to the distance from the end surface to the groove, and a second area formed more distal from the light emitting device than the first area in which an increasing rate of the depth of the groove with respect to the distance from the end surface is greater than that in the first area, in the second area, the depth of the groove is given by a quadratic function, cubic function or exponential function of the groove and the distance from the groove to the end surface disposed with the light emitting device, a width of the light guide is 4 mm or greater, and the pitch between the grooves is formed to be constant irrespective of the distance from the end surface disposed with the light emitting device or formed wider in accordance with the distance from the end surface, wherein a pitch z (μm) of the groove and a distance x (mm) from the end surface disposed with the light emitting device satisfy expression $z=a_5 x+b_5$, where $a_5$ is larger than 0 and less than 14, and $b_5$ ranges from 180 to 250.

23. A lighting device comprising:

a light guide plate;

a light guide disposed along a side end surface of the light guide plate; and a light emitting device disposed on an end surface of the light guide, wherein a plurality of wedge-shaped grooves seen in cross section extending in a thickness direction of the light guide is formed and arranged in a backside of the light guide on an opposite side of the light guide plate, in a distribution of a pitch between the grooves with respect to a distance from the end surface disposed with the light emitting device to groove, a depth of the groove is formed more deeply as the groove is positioned more distal from the end surface, in a distribution of the depth of the groove with respect to the distance from the end surface disposed with the light emitting device to the groove, there are a first area where the depth of the groove is linearly increased with respect to the distance from the end surface to the groove, and a second area formed more distal from the light emitting device than the first area in which an increasing rate of the depth of the groove with respect to the distance from the end surface is greater than that in the first area, in the second area, the depth of the groove is given by a quadratic function, cubic function or exponential function of the groove and the distance from the groove to the end surface disposed with the light emitting device, a width of the light guide is below 4 mm, and the pitch between the grooves is formed narrower in accordance with the distance from the end surface disposed with the light emitting device, wherein a pitch z (μm) of the groove and a distance x (mm) from the end surface disposed with the light emitting device satisfy expression $z=a_6 x+b_6$, where $a_6$ ranges from −14 to 0, and $b_6$ ranges from 280 to 350.

* * * * *